(12) United States Patent
Li et al.

(10) Patent No.: US 10,419,264 B2
(45) Date of Patent: Sep. 17, 2019

(54) SUBFRAME STRUCTURE FOR THE CO-EXISTENCE NETWORK OF SIDELINK AND MISSION CRITICAL MOBILE DEVICES

(71) Applicant: QUALCOMM Incorporated, San Diego, CA (US)

(72) Inventors: Chong Li, Weehawken, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 15/590,786

(22) Filed: May 9, 2017

(65) Prior Publication Data

US 2018/0034683 A1     Feb. 1, 2018

Related U.S. Application Data

(60) Provisional application No. 62/367,306, filed on Jul. 27, 2016.

(51) Int. Cl.
*H04L 29/08* (2006.01)
*H04W 52/00* (2009.01)
(Continued)

(52) U.S. Cl.
CPC .... *H04L 29/08603* (2013.01); *H04L 29/0845* (2013.01); *H04L 29/08306* (2013.01); *H04L 29/08333* (2013.01); *H04L 29/08396* (2013.01); *H04L 29/08423* (2013.01); *H04L 29/08567* (2013.01); *H04L 29/08576* (2013.01); *H04W 52/00* (2013.01); *H04W 52/0216* (2013.01); *H04W 52/0219* (2013.01);
(Continued)

(58) Field of Classification Search
CPC . H04W 76/14; H04W 76/383; H04W 76/367; H04W 72/1242
See application file for complete search history.

(56) References Cited

U.S. PATENT DOCUMENTS

2009/0257388 A1* 10/2009 Khandekar ........... H04W 16/14
                                                       370/329
2012/0327850 A1    12/2012 Wang et al.
(Continued)

OTHER PUBLICATIONS

International Search Report and Written Opinion—PCT/US2017/043360—ISA/EPO—dated Sep. 26, 2017 (13 total pages).

*Primary Examiner* — Kent K Krueger
(74) *Attorney, Agent, or Firm* — Arent Fox, LLP

(57) ABSTRACT

Aspects of the present disclosure provide methods for modifying the numerology of the D2D frame structure to match the numerology of the Macro cell communication frame structure. Particularly, the present disclosure introduces techniques that allow the D2D devices to partition a long-TTI D2D transmission into a plurality of segments such that each segment may fit into a short-TTI MiCr uplink (UL) subframe. The present disclosure also provides techniques for scheduling D2D transmission and managing transmission power of the D2D communication to minimize the interference with the MiCr communication on the macro cell while maximizing the spectrum utilization.

30 Claims, 7 Drawing Sheets

(51) Int. Cl.
*H04W 72/12* (2009.01)
*H04W 76/14* (2018.01)
*H04W 52/02* (2009.01)
*H04W 52/04* (2009.01)
*H04W 52/38* (2009.01)
*H04W 52/36* (2009.01)

(52) U.S. Cl.
CPC ......... *H04W 52/04* (2013.01); *H04W 52/383* (2013.01); *H04W 72/1242* (2013.01); *H04W 76/14* (2018.02); *H04W 52/367* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/20* (2018.01); *Y02D 70/21* (2018.01)

(56) References Cited

U.S. PATENT DOCUMENTS

| | | | |
|---|---|---|---|
| 2014/0321272 A1* | 10/2014 | Bangolae | H04W 4/70 370/230 |
| 2014/0362832 A1 | 12/2014 | Rudolf et al. | |
| 2015/0264733 A1 | 9/2015 | Guo et al. | |
| 2015/0312915 A1 | 10/2015 | Li et al. | |
| 2015/0334686 A1 | 11/2015 | Ji et al. | |
| 2016/0128045 A1 | 5/2016 | Azarian Yazdi et al. | |
| 2016/0128056 A1 | 5/2016 | Jiang et al. | |
| 2016/0270116 A1 | 9/2016 | Lin et al. | |
| 2017/0285130 A1* | 10/2017 | Kim | H04L 1/00 |

\* cited by examiner

SUBFRAME STRUCTURE FOR THE CO-EXISTENCE NETWORK OF SIDELINK AND MISSION CRITICAL MOBILE DEVICES

CROSS-REFERENCE TO RELATED APPLICATION(S)

This application claims benefit of U.S. Provisional Application Ser. No. 62/367,306, entitled "SUBFRAME STRUCTURE FOR THE CO-EXISTENCE NETWORK OF SIDELINK AND MISSION CRITICAL MOBILE DEVICES" and filed on Jul. 27, 2016, which is expressly incorporated by reference herein in its entirety.

BACKGROUND

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on device-to-device (D2D) communication functionalities, which allow two nearby devices (e.g., UEs) to communicate with each other in the licensed cellular bandwidth without base station involvement or with limited BS involvement. However, introduction of D2D poses many new challenges and risks to long-standing cellular architecture, which is centered around the base station managing the array of mobile devices within its coverage area.

For example, D2D communication operating concurrently with conventional cellular type wireless communication (e.g., uplink or downlink communication between base station and mobile device(s)) may result in one or both communications experiencing interference on the resources. (e.g., inter-carrier interference (ICI)). Additionally, D2D communication generally requires high transmission power in order to facilitate D2D discovery and the coverage of the D2D direct communication. In such cases, if a D2D device and an existing cellular device use frequency-divided resources in a same subframe, a signal transmitted for a discovery and/or a communication by the D2D device may cause In-Band Emission (IBE) with a channel transmitted to the base station from the existing cellular device. Conversely, if a D2D device and an existing cellular device use time-divided resources in the same frequency band, a signal transmitted for a discovery and/or a communication by the D2D device may cause Inter-Symbol Interference (ISI) with a channel transmitted to the base station from the existing cellular device.

Another issue that arises from D2D communication is the potential for causing misalignment in subframe structure between concurrent conventional cellular communications and D2D communications. For example, in wireless communication networks that operate according to different ones of a plurality of communication technologies (e.g., 5G, 4G/LTE, 3G, Wi-Fi, Bluetooth, etc.), the macro network may operate in accordance with one transmission time interface (TTI) subframe structure while the D2D communication may be limited to a second non-conforming TTI subframe structure. The non-compliance of the frame structures in two communications may result in inefficient spectrum utilization. This is more pronounced when addressing UEs that may have mission critical (MiCr) application (e.g., applications that facilitate remote medical surgeries and require communications that satisfy ultra-reliability and low end-to-end latency). To achieve the reliability and latency requirements of MiCr applications, the macro cell (e.g., base station) associated with a MiCr device may apply a short TTI (e.g., 125 µs) for fast downlink and uplink turn-around between the base station and the MiCr UE. In contrast, D2D communication generally requires long TTI (e.g., 500 µs). The dissimilar characteristics of each with respect to frame structures and varying symbol lengths may result in the communications having different numerology, and thus causing misalignment of communication over the wireless channel.

SUMMARY

Aspects of the present disclosure resolve the above-identified issues by modifying the numerology of the D2D frame structure to match the numerology of the Macro cell communication frame structure. Particularly, the present disclosure introduces techniques that allow D2D devices to partition a long-TTI D2D transmission into a plurality of segments such that each segment may fit into a short-TTI MiCr uplink (UL) subframe. The present disclosure also provides techniques for scheduling D2D transmission and managing transmission power of the D2D communication to minimize interference with the MiCr communication on the macro cell while maximizing spectrum utilization. In one example, aspects of the present disclosure schedule transmission of one or more partitioned segments of D2D subframe at maximum power when there is no uplink MiCr traffic scheduled for a particular time slot. In another example, if there is MiCr uplink traffic for the base station during a specified time slot, the D2D device may yield or suspend its transmission, or alternatively reduce its transmission power so as to minimize interference to uplink traffic.

In one example, a method for wireless communications is disclosed. The method may include identifying a packet for transmission from a first UE to a second UE. The method may further include receiving, at the first UE, a suspend message from a base station when the packet is scheduled for transmission between the first UE and the second UE during a time period reserved for an uplink communication. The method may further include suspending, at the first UE, communication with the second UE based on receiving the suspend message from the base station.

In another example, an apparatus for wireless communications is disclosed. The apparatus may include a processor and a memory coupled to the processor. The memory may include instructions executable by the processor to receive, at the first UE, a suspend message from a base station when the packet is scheduled for transmission between the first UE and the second UE during a time period reserved for an uplink communication. The instructions may further be executable to suspend, at the first UE, communication with the second UE based on receiving the suspend message from the base station.

In another example, a computer readable medium for wireless communications is disclosed. The computer readable medium may include code for identifying a packet for transmission from a first UE to a second UE. The code may further include receiving, at the first UE, a suspend message from a base station when the packet is scheduled for transmission between the first UE and the second UE during a time period reserved for an uplink communication. The code may further include suspending, at the first UE, communication with the second UE based on receiving the suspend message from the base station.

In another example, an apparatus for wireless communications is disclosed. The apparatus may include means for identifying a packet for transmission from a first UE to a second UE and means for receiving, at the first UE, a suspend message from a base station when the packet is scheduled for transmission between the first UE and the second UE during a time period reserved for an uplink communication. The apparatus may further include means for suspending, at the first UE, communication with the second UE based on receiving the suspend message from the base station.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
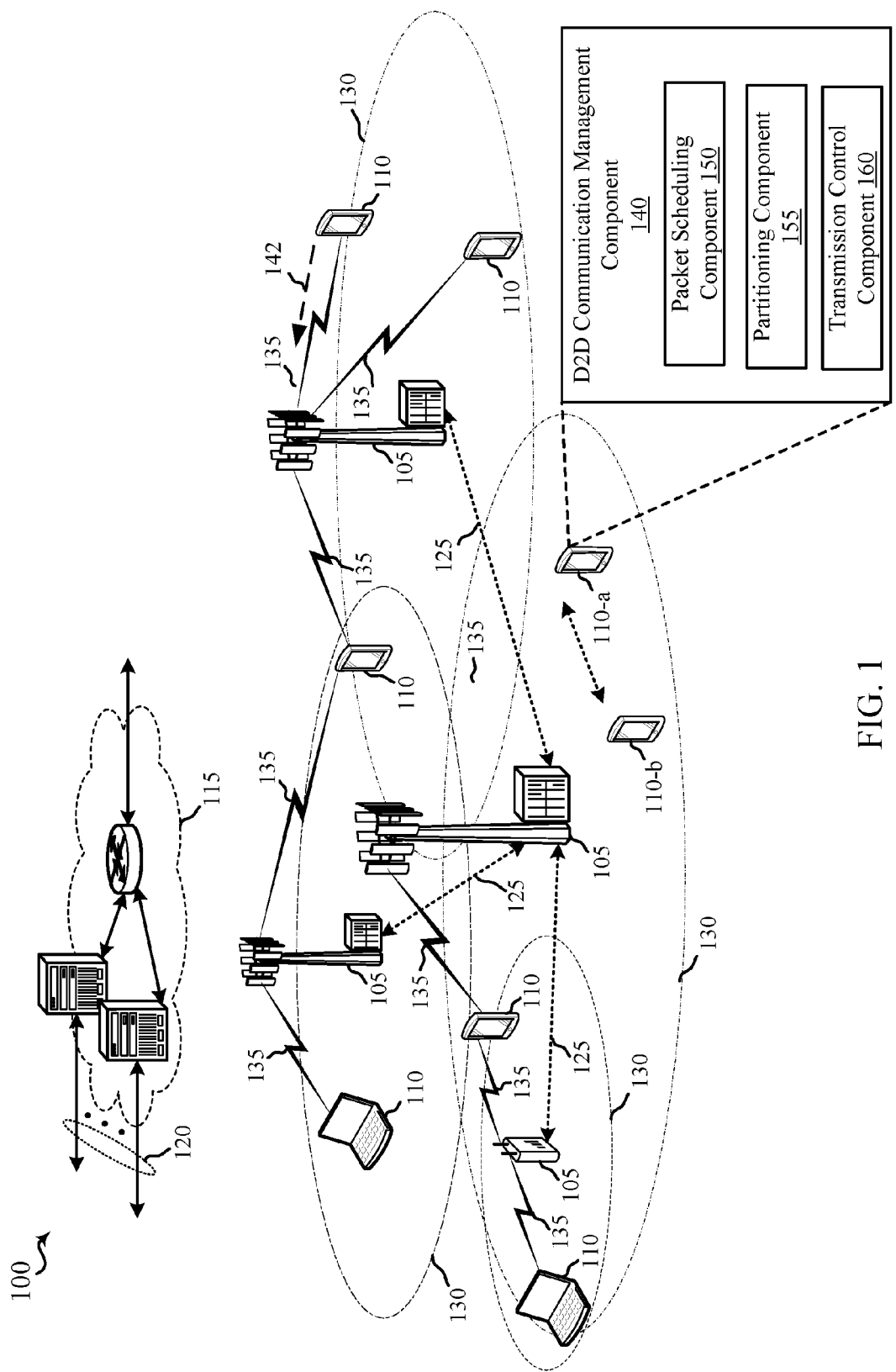
FIG. 1 is a schematic diagram of a wireless communication network in accordance with an exemplary embodiment of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

In the current market, technologies such as Wi-Fi or Bluetooth provide some D2D communication functionality. However, these work in an unlicensed band, and any interference in the unlicensed band is generally uncontrollable. In addition, D2D communication via conventional techniques do not provide security and quality of service (QoS) guarantee as do cellular networks. Unwilling to lose the emerging D2D market, cellular operators and vendors are exploring the possibilities of introducing D2D communication capability into cellular networks. However, introduction of D2D communication in cellular networks gives rise to a number of issues. Among others, one fundamental issue is how to share spectrum resources between cellular and D2D communications.

Such an issue is brought to the forefront when D2D communication is attempted in a cellular network utilizing a different TTI subframe structure than the D2D devices. As discussed briefly above, some mission critical (MiCr) applications (e.g., applications that facilitate remote medical surgeries) require ultra-reliability and low end-to-end latency. To achieve the reliability and latency requirements of the MiCr applications, the macro cell (e.g., base station) and MiCr UE in the cellular network may apply a short TTI (e.g., 125 µs) for fast downlink and uplink turn-around between the base station and the MiCr UE. In contrast, D2D communication generally requires long TTI (e.g., 500 µs) because of the need for control signaling (e.g., request to send (RTS), clear to send (CTS)) to coordinate communication. The dissimilar characteristics of each of frame structures may result in the communications having different numerology, and thus causing misalignment of the communication over the wireless channel.

Aspects of the present disclosure resolve the above-identified issues by modifying the numerology of the D2D frame structure to match the numerology of the Macro cell communication frame structure. Particularly, the present disclosure introduces techniques to suspend a sidelink communication between two or more UEs that use long TTI (e.g., 500 µs) when the sidelink communication may interfere with an uplink macro communication utilizing short TTI (e.g., 125 µs) between a third UE and the base station). The term "sidelink communication/transmission" may refer to the D2D direct communication between, for example, a first UE and a second UE without involvement of the base station. In some aspects, a base station, detecting a potential collision between sidelink communication and macro communication, may signal a suspend message to UEs involved in the sidelink communication to suspend or otherwise stop the sidelink communication using the longer TTI. The suspend message may include a suspend duration period that indicates a length of time that the communication between a first UE and the second UE is to be suspended. At the completion of the uplink macro communication, the base station may also transmit a resume message to the one or more UEs involved in the sidelink communication to resume D2D communication between the first UE and the second UE.

During the suspend period identified by the base station, the sidelink UE may partition a long-TTI D2D transmission into a plurality of segments such that each segment may fit into a short-TTI MiCr uplink (UL) subframe. In some examples, the present disclosure also provides techniques for scheduling D2D transmission and managing transmission power of the D2D communication to minimize interference that may be experienced by MiCr UEs. In one example, aspects of the present disclosure schedule transmission of one or more partitioned segments of D2D subframe at maximum power when there is no uplink MiCr traffic scheduled for a particular time slot (e.g., when MiCr UE is not scheduled to transmit an UL frame to the base station). In another example, if there is MiCr uplink traffic scheduled for the base station during a specified time slot, the D2D device may yield or suspend its transmission. Alternatively, in such cases, the D2D device may reduce its transmission power as to minimize interference to the MiCr uplink traffic.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a D2D communication management component 140 configured to perform one or more techniques described herein. The D2D communication management component 140 may include a packet scheduling component 150 for scheduling one or more D2D communication traffic between a first UE (e.g., UE 110-a) and a second UE (e.g., UE 110-b). The D2D communication management component 140 may further include partitioning component 155 configured to partition a long TTI D2D transmission into the plurality of segments where each of the plurality of segments fit into short-TTI MiCr uplink subframe. Additionally or alternatively, the D2D communication management component 140 may include a transmission control component 160 for coding transmission of the plurality of segments from the first UE (e.g., UE 110-a) to the second UE (e.g., UE 110-b) using D2D direct communication in the one or more time slots.

The wireless communication network 100 may also include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, base stations 105 may communicate, either directly or indirectly (e.g., through core network 115), with one another over backhaul links 125 (e.g., X1, etc.), which may be wired or wireless communication links.

The base stations 105 may wirelessly communicate with UEs 110 via one or more base station antennas. Each of the base stations 105 may provide communication coverage for a respective geographic coverage area 130. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage area 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry UL transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
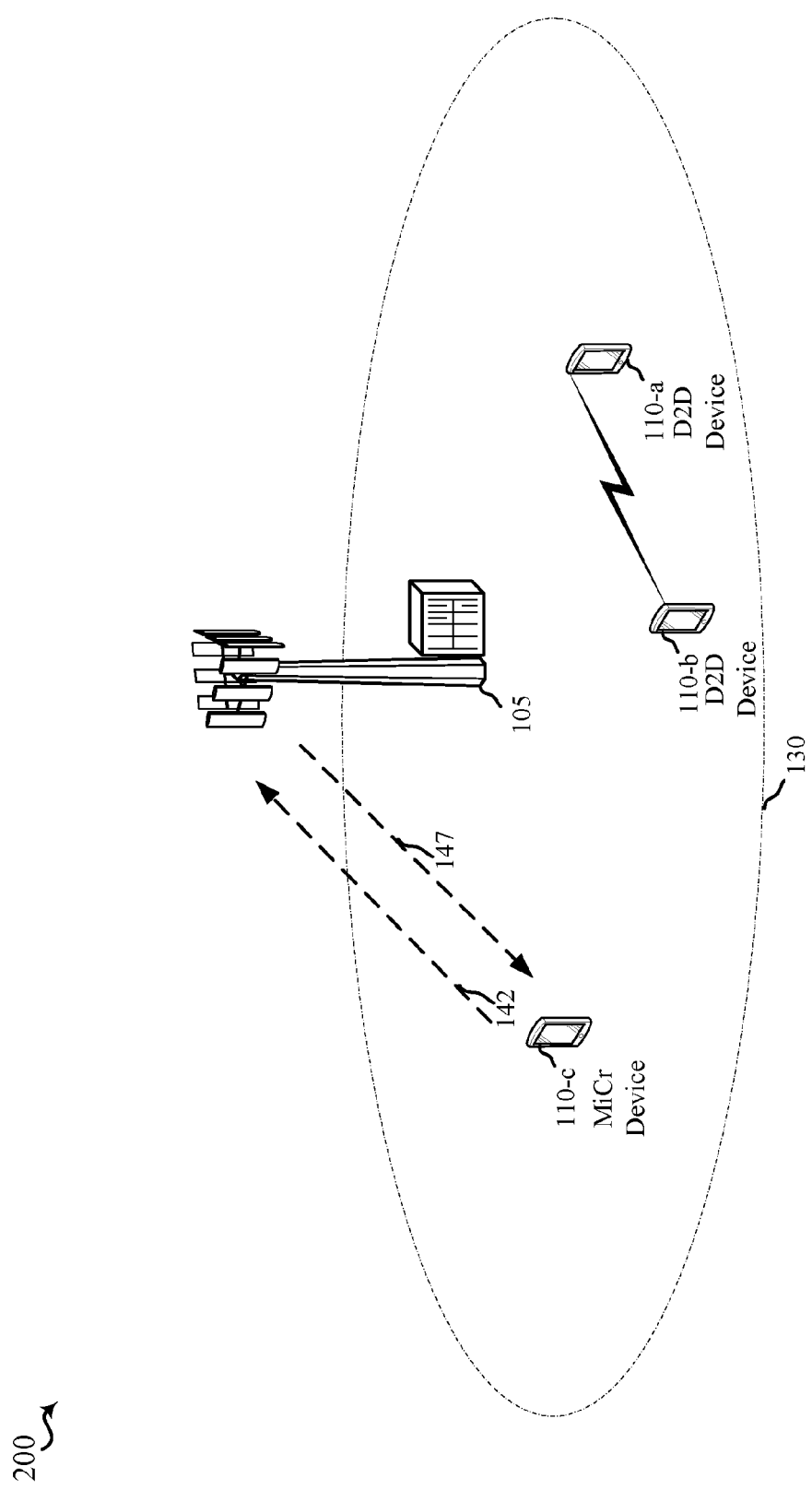
FIG. 2 is a diagram of another wireless communication network that illustrates D2D communication in accordance with exemplary embodiment of the present disclosure.

Referring now to FIG. 2, aspects of the present disclosure provide techniques for establishing direct D2D communication with device controlled link establishment. In some examples, the wireless communication network 200 that may be similar to the communication network 100 described with reference to FIG. 1 may include a base station 105 and one or more UEs 110.

In one example, at least one UE (e.g., UE 110-c) may be a MiCr UE executing a MiCr application (e.g., public safety or remote surgery application) that requires low latency and high reliability communication. In such examples, the MiCr UE 110-c and the base station 105 may communicate using short TTI (e.g., 125 μs) subframe structure (see FIG. 4) for fast downlink 147 and uplink 142 turnaround. Additionally, the wireless communication network 200 may include D2D devices (e.g., UE 110-a and 110-b) that may be in the coverage area 130 of the base station 105. In some examples, D2D direct communication may entail source and destination devices having direct communication with each other without (or with minimal) operator control. In some examples, D2D devices (e.g., UE 110-a and 110-b) generally utilize a long TTI (e.g., 500 μs) subframe structure (see FIG. 3). However, because of the diverging subframe structures, long TTI subframe structure may not be compatible for concurrent communication in a wireless communication network 200 where the macro cell is relying on a different short TTI subframe structure.

Accordingly, aspects of the present disclosure provide methods for D2D devices (e.g., UE 110-a and b) to partition a long-TTI sidelink transmission into several segments where each segment fits into a short-TTI MiCr UL subframe. For the purposes of the present disclosure, the term "sidelink transmission" may refer to the D2D direct communication between, for example, UE 110-*a* and UE 110-*b* without involvement of the base station 105. Thus, unlike communications from a UE to a base station (i.e., uplink transmissions) or communications from a base station to a UE (i.e., downlink transmissions), a "sidelink transmission" may involve direct communications between UEs.

In further examples, the source D2D device (e.g., UE 110-*a*) may schedule transmission of the one or more partitioned segments during a time slot reserved for uplink 142 macro communication (e.g., time slot during which MiCr UE 110-*c* would ordinarily be expected to transmit uplink traffic to the base station 105).

In some aspects, the source D2D device (e.g., UE 110-*a*) may transmit the plurality of partitioned segments to the destination D2D device (e.g., UE 110-*b*) using maximum transmission power of its respective antennas when it is determined that no uplink traffic is scheduled for the base station 105 in the eNB-assigned sidelink subframe. In other words, the source D2D device may determine based on the control signaling whether the MiCr UE 110-*c* intends to transmit uplink traffic to the base station 105 during a particular time slot. In the event, no uplink traffic is scheduled by MiCr UE 110-*c* for a particular time slot, the source D2D device (e.g., UE 110-*a*) may establish D2D direct communication with the destination D2D device (e.g., UE 110-*b*) using maximum transmission power.

In contrast, if there is uplink traffic scheduled by MiCr UE 110-*c* for the base station 105 in the eNB-assigned sidelink subframe, the source D2D device (e.g., UE 110-*a*) may either suspend its transmission for the particular timeslot, or alternatively, power fallback (e.g., transmission power reduction from maximum power) to certain extent such that the interference to uplink traffic is minimized. In some aspects, the base station 105 may be configured to transmit an indication to the one or more D2D devices (e.g., UE 110-*a* and 110-*b*) whether or not to perform power reduction based on the base station's 105 determination on the amount of interference that may result from concurrent D2D direct communication while MiCr UE 110-*c* is transmitting uplink traffic 142 to the base station 105. In some examples, the base station 105 may make such determination based on calculating the relative proximity of the one or more D2D devices within the coverage area 130 to the MiCr UE 110-*c*.

Figure 3:
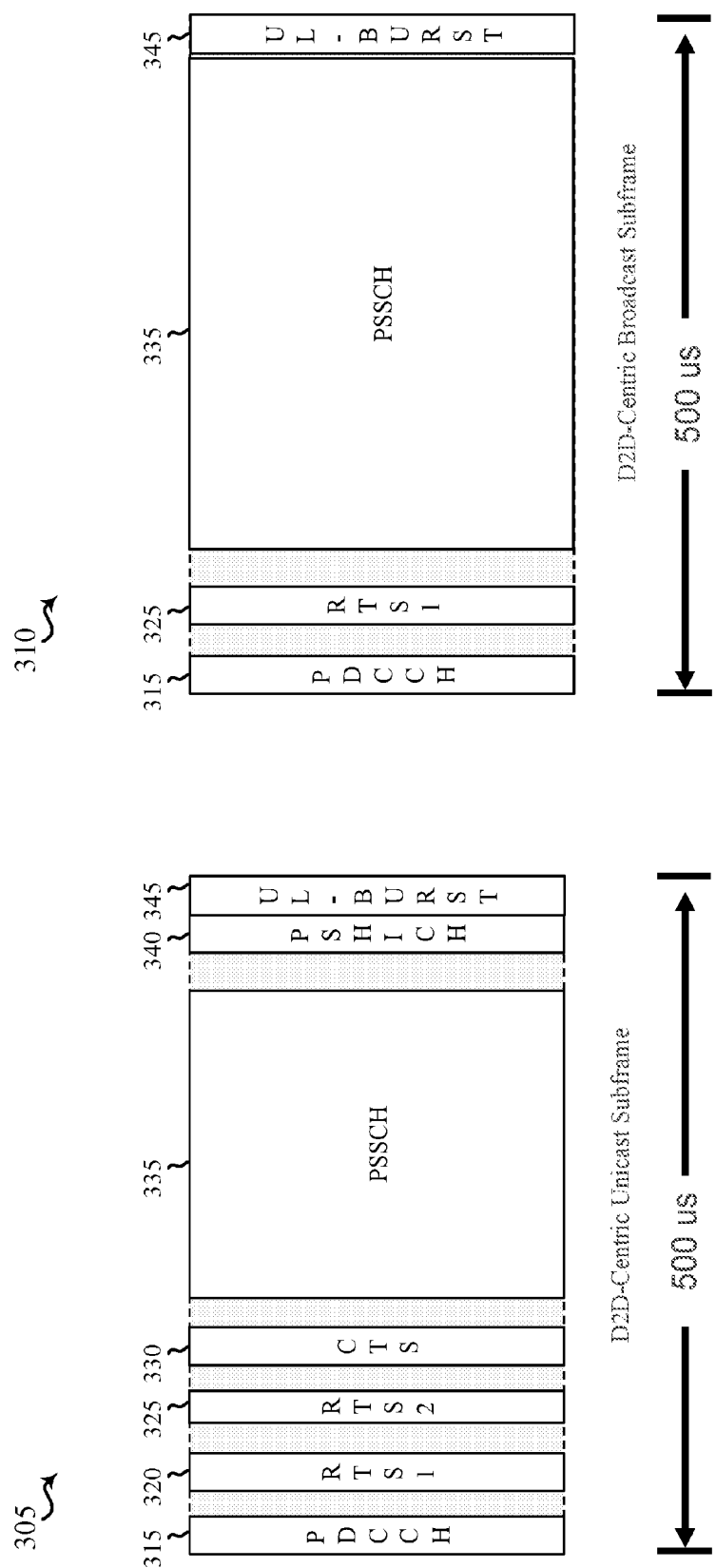
FIG. 3 is a subframe structure of D2D-centric unicast subframes and D2D-centric broadcast subframe that require long TTI.

FIG. 3 is a subframe structure of D2D-centric unicast subframes 305 and D2D-centric broadcast subframe 310 that require long TTI (e.g., 500 μs). To accomplish D2D direct communication, D2D-centric unicast subframe 305 (e.g., subframe used for transmitting packets from a single source destination to a single destination device) utilizes a PDCCH 315 for carrying downlink control information (DCI). In some aspects, the PDCCH 315 may carry scheduling assignments and other control information to facilitate D2D direct communication. The D2D-centric unicast subframe 305 may also include one or more RTS 320 (and RTS 325) and CTS (330) portions that may be used by the D2D devices to reduce frame collisions in a scheme, commonly referred to as "RTS/CTS flow control" or "RTS/CTS handshaking." Thus, in some aspects, when a first device (e.g., UE 110-*a*) has something it wants to send to the second device (e.g., UE 110-*b*), it sends a Ready To Send (RTS) signal, and waits for a Clear to Send (CTS) signal from the recipient when the second device is ready to receive the data. Additionally or alternatively, the D2D-centric unicast subframe 305 may include physical sidelink shared channel (PSSCH) 335 portion for carrying the data from the first device to the second device. The D2D-centric unicast subframe 305 may also include a physical sidelink hybrid-ARQ indicator channel (PSHICH) that may be used as a control channel to indicate the reception of PUSCH transmission from another UE 110. In some aspects, the PSHICH 335 may include a bit that identifies whether the source UE (e.g., UE 110-*a*) needs to retransmit portion of a previously transmitted packet (e.g., the bit may indicate an acknowledgement (ACK) or negative acknowledgment (NACK)).

Aspects of the present disclosure may also include utilizing D2D communication for broadcast frames such as D2D-centric broadcast subframe 310 (e.g., subframe used for transmitting packets from a single source destination to multiple destination devices). The D2D-centric broadcast subframe 310 may have an overlapping portions from the unicast frame, with the exception of the CTS portion 330 that may not be required in broadcast environment.

Figure 4:
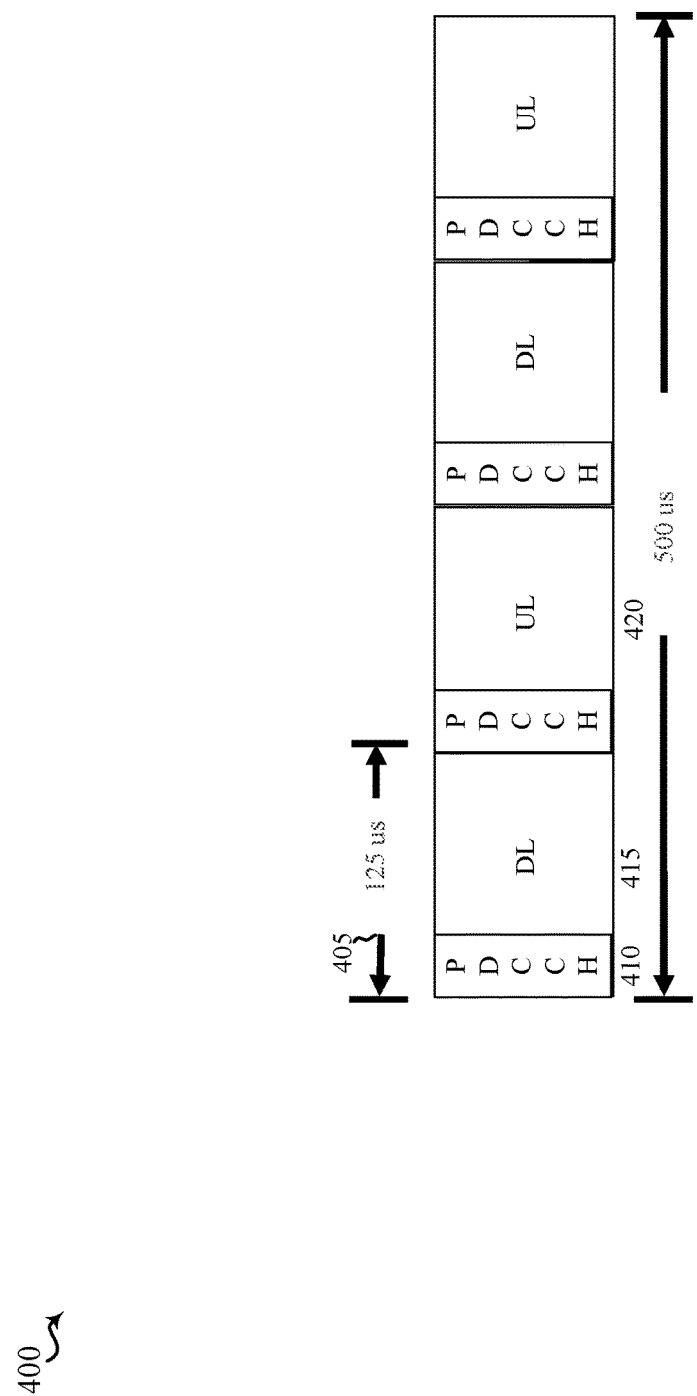
FIG. 4 illustrates a MiCr short TTI subframe structure in accordance with exemplary embodiment of the present disclosure.

Turning now to FIG. 4, a MiCr short TTI subframe structure 400 in accordance with an exemplary embodiment of the present disclosure is illustrated. In contrast to the D2D-centric subframes described in FIG. 3, the MiCr short TTI subframe structure 400 includes a subframe structure that extends only 125 μs 405. The MiCr short TTI subframe structure 400 may be utilized by one or more MiCr UEs 110-*c* to communicate with the base station 105 for mission critical applications.

In some examples, the MiCr short TTI subframe structure 400 may include PDCCH 410 for carrying scheduling assignments and other control information to facilitate D2D direct communication. MiCr short TTI subframe structure 400 may include alternating data portions for downlink 415 and uplink 420 traffic, each with corresponding PDCCH 410 associated with the subframe.

Figure 5:
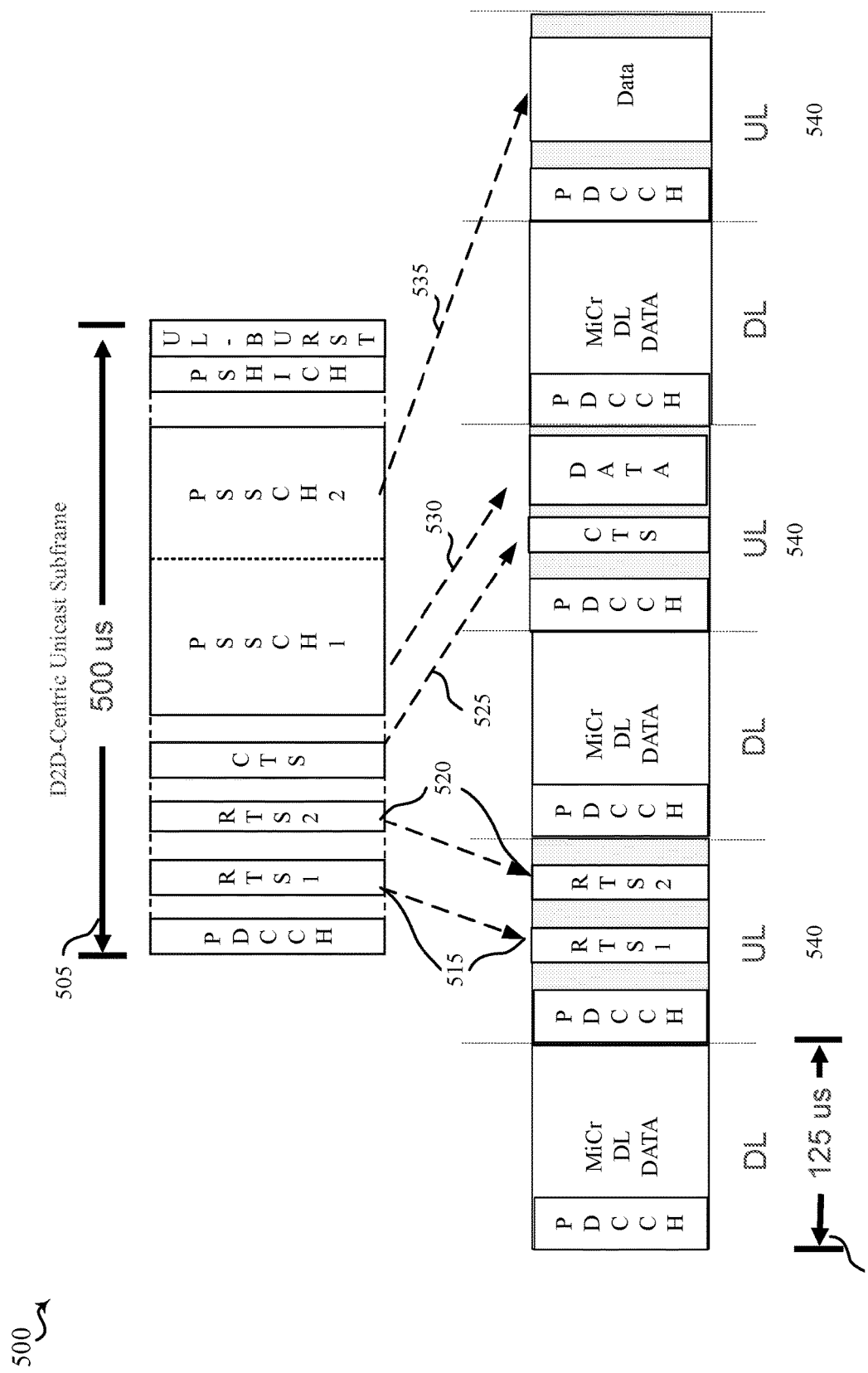
FIG. 5 is a diagram illustrating partitioning of the D2D-centric subframe into a plurality of segments that fit into MiCr short TTI subframe structure.

FIG. 5 is a diagram 500 illustrating partitioning of the D2D-centric subframe 505 into a plurality of segments that fit into MiCr short TTI subframe structure 510. In some examples, aspects of the present disclosure may identify a packet (e.g., 505) for transmission from a first UE to a second UE, wherein the packet has a first size (e.g., 500 μs). In some examples, the present disclosure partitions the packet into a plurality of segments where each of the plurality of segments may be of a second size that is different and smaller than the first size. In one or more examples, partitioning the packet may include partitioning a long TTI D2D transmission 505 into the plurality of segments (e.g., 515, 520, 525, 530, and 535) that fit into short-TTI MiCr uplink subframe 540. Based on the partitioning, the source D2D device may schedule the transmission of the plurality of partitioned segments by determining whether there is uplink traffic scheduled for a base station in an eNB-assigned D2D subframe. Particularly, the source D2D device may determine, based on the control signaling, whether the MiCr UE intends to transmit uplink traffic to the base station 105 during a particular time slot (e.g., 540). In the event, no uplink traffic is scheduled by MiCr UE for a particular time slot, the source D2D device may establish D2D direct communication with the destination D2D device using maximum transmission power.

In contrast, if there is uplink traffic scheduled by MiCr UE for the base station 105 in the eNB-assigned sidelink subframe 540, the source D2D device may either suspend its transmission for the particular timeslot, or alternatively, power fallback (e.g., transmission power reduction from maximum power) to certain extent such that the interference to uplink traffic is minimized. In some aspects, the base station may be configured to transmit an indication to the one or more D2D devices whether or not to perform power reduction based on the base station's determination on the amount of interference that may result from concurrent D2D direct communication while MiCr UE is transmitting uplink traffic to the base station. Thus, at every uplink subframe 540 transmission opportunity, the source D2D device may transmit at least a portion of the D2D-Centric subframe packet by partitioning the packet into a plurality of segments, each segment fitting into short-TTI MiCr UL subframe.

Figure 6:
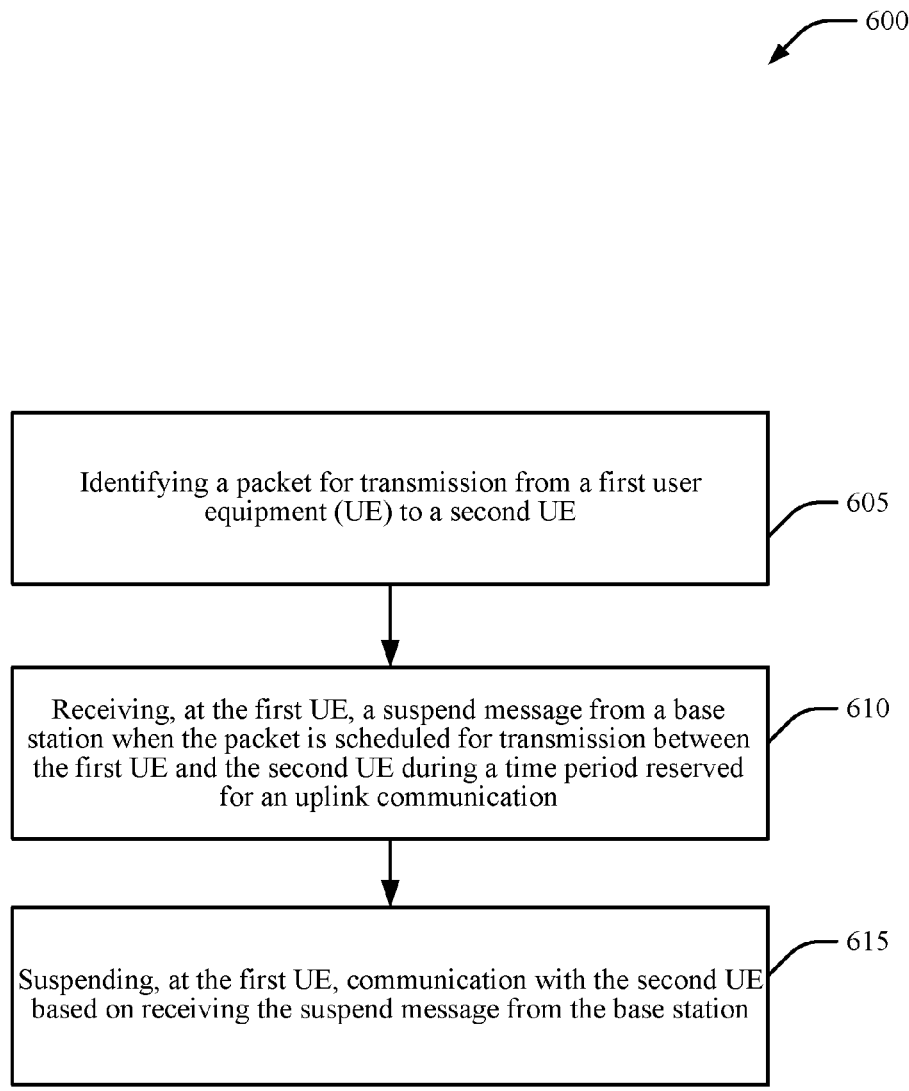
FIG. 6 is a flowchart of an example method in accordance with aspects of the present disclosure.

FIG. 6 is a flowchart of an example method 600 of techniques described in accordance with various aspects of the present disclosure. The method 600 may be performed using an apparatus (e.g., the UE 110, for example). Although the method 600 is described below with respect to the elements of the UE 110, other components may be used to implement one or more of the steps described herein.

At block 605, the method may include identifying a packet for transmission from a first UE to a second UE. For example, the source D2D device may determine that there are one or more packets queued to be transmitted to the destination D2D device(s). Aspects of block 605 may be performed by packet scheduling component 150 described with reference to FIG. 7.

At block 610, the method may include receiving, at the first UE, a suspend message from a base station when the packet is scheduled for transmission between the first UE and the second UE during a time period reserved for an uplink communication. In some examples, the suspend message may include a suspend duration period that indicates a length of time that the communication between the first UE and the second UE is to be suspended for. In some aspects, after the completion of the macro communication (i.e., MiCr uplink communication from a third UE and the base station), the first UE may again receive a resume message that indicates that the sidelink UEs (e.g., first UE and the second UE) may resume D2D communication. Aspects of block 610 may be performed by transceiver 702 described with reference to FIG. 7. In some aspects, the first UE may utilize a TTI that is longer than a TTI utilized by the third UE. The third UE utilizing the short TTI for MiCr applications.

At block 615, the method may include suspending, at the first UE, communication with the second UE based on receiving the suspend message from the base station. In some examples, suspending the sidelink communication may include partitioning the packet into a plurality of segments. Partitioning the packet into the plurality of segments comprises partitioning a first TTI D2D transmission into the plurality of segments such that each of the plurality of segments fit into a second TTI MiCr uplink subframe. In some examples, the first TTI may be larger (e.g., in time) than the second TTI. Further, during the sidelink suspend period, the method may include scheduling transmission of the plurality of segments in one or more time slots reserved for uplink macro communication. In some examples, scheduling transmission of the plurality of segments in the one or more time slots reserved for uplink macro communication may comprise determining whether there is an uplink traffic scheduled for a base station in an uplink macro subframe for a first TTI and suspending the transmission of the plurality of segments for a subframe when there is the uplink traffic scheduled for the base station in the uplink macro subframe for a first TTI. The method may include transmitting the plurality of segments from the first UE to the second UE using direct communication in the one or more time slots. In some examples, transmitting the plurality of segments from the first UE to the second UE using D2D direct communication may comprise determining a transmission power to be used by the first UE for transmitting the plurality of segments from the first UE to the second UE. In some aspects, the first UE (e.g., source D2D device) determines whether there is an uplink traffic scheduled for a base station in an uplink macro subframe for a first TTI. Accordingly, the method may include transmitting a subset of the plurality of segments at a maximum transmission power on a second TTI subframe based on the determining that there is no uplink traffic scheduled for the base station in the uplink macro subframe for the first TTI. Alternatively, the method may include transmitting the subset of the plurality of segments at a reduced transmission power on a second TTI subframe based on the determining that there is uplink traffic scheduled for the base station in the uplink macro subframe for the first TTI. Aspects of block 615 may be performed by combination of partitioning component 155, packet scheduling component 150, and transmission control component 160 described with reference to FIG. 7.

Figure 7:
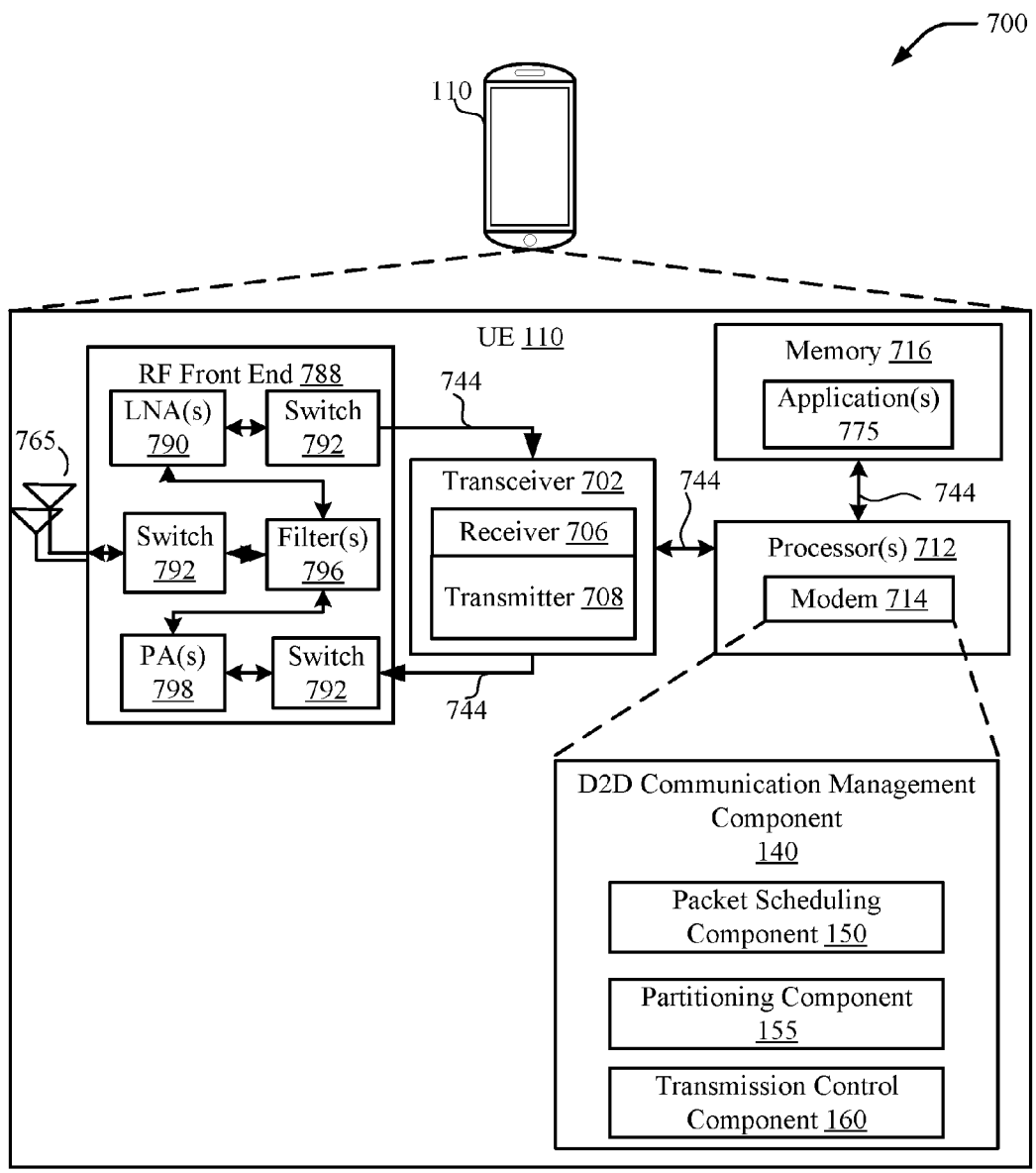
FIG. 7 is a schematic diagram of an aspect of an implementation of various components of the UE configured for establishing D2D communication with another UE in accordance with various aspects of the present disclosure.

FIG. 7 describe hardware components and subcomponents of the UE 110 for implementing one or more methods (e.g., method 600) described herein in accordance with various aspects of the present disclosure. For example, one example of an implementation of UE 110 may include a variety of components, some of which have already been described above, but including components such as one or more processors 712 and memory 714 and transceiver 702 in communication via one or more buses 744, which may operate in conjunction with D2D communication management component 140 to enable one or more of the functions described herein related to including one or more methods of the present disclosure. Further, the one or more processors 712, modem 714, memory 716, transceiver 702, RF front end 788 and one or more antennas 765, may be configured to support voice and/or data calls (simultaneously or non-simultaneously) in one or more radio access technologies.

In an aspect, the one or more processors 712 can include a modem 714 that uses one or more modem processors. The various functions related to D2D communication management component 140 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with D2D communication management component 140 may be performed by transceiver 702.

Also, memory 714 may be configured to store data used herein and/or local versions of applications or D2D communication management component 140 and/or one or more of its subcomponents being executed by at least one processor 712. Memory 716 can include any type of computer-readable medium usable by a computer or at least one processor 1712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining D2D communication management component 140 and/or one or more of its subcomponents, and/or data associated therewith, when UE 110 is operating at least one processor 1012 to execute D2D communication management component 140 and/or one or more of its subcomponents.

Transceiver 702 may include at least one receiver 706 and at least one transmitter 1008. Receiver 706 may include hardware, firmware, and/or software code executable by a processor for receiving data, the code comprising instructions and being stored in a memory (e.g., computer-readable medium). Receiver 708 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 702 may including, but is not limited to, an RF transmitter.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 1098 may have specified minimum and maximum gain values. In an aspect, RF front end 1088 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 1092 to select a transmit or receive path using a specified filter 796, LNA 790, and/or PA 798, based on a configuration as specified by transceiver 1002 and/or processor 712.

As such, transceiver 712 may be configured to transmit and receive wireless signals through one or more antennas 765 via RF front end 788. In an aspect, transceiver may be tuned to operate at specified frequencies such that UE 110 can communicate with, for example, one or more base stations 105 or one or more cells associated with one or more base stations 105. In an aspect, for example, modem 714 can configure transceiver 702 to operate at a specified frequency and power level based on the UE configuration of the UE 110 and the communication protocol used by modem 714.

In an aspect, modem 714 can be a multiband-multimode modem, which can process digital data and communicate with transceiver 702 such that the digital data is sent and received using transceiver 702. In an aspect, modem 714 can be multiband and be configured to support multiple frequency bands for a specific communications protocol. In an aspect, modem 714 can be multimode and be configured to support multiple operating networks and communications protocols. In an aspect, modem 714 can control one or more components of UE 110 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The D2D communication management component 140 may include a packet scheduling component 150 for scheduling one or more D2D communication traffic between a first UE (e.g., UE 110-*a*) and a second UE (e.g., UE 110-*b*). The D2D communication management component 140 may further include partitioning component 155 configured to partition a long TTI D2D transmission into the plurality of segments that fit into short-TTI MiCr uplink subframe. Additionally or alternatively, the D2D communication management component 140 may include a transmission control component 160 for cording transmission of the plurality of segments from the first UE (e.g., UE 110-*a*) to the second UE (e.g., UE 110-*b*) using D2D direct communication in the one or more time slots.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   identifying a packet for transmission from a first user equipment (UE) to a second UE via a device-to-device (D2D) transmission;
   receiving, at the first UE, a suspend message from a base station when the packet is scheduled for transmission between the first UE and the second UE during a time period reserved for an uplink communication; and
   suspending, at the first UE, communication of the packet with the second UE based on receiving the suspend message from the base station.

2. The method of claim 1, wherein suspending the communication between the first UE and the second UE comprises:
   partitioning the packet into a plurality of segments;
   scheduling transmission of the plurality of segments in one or more time slots; and
   transmitting the plurality of segments from the first UE to the second UE using direct communication in the one or more time slots.

3. The method of claim 2, wherein partitioning the packet into the plurality of segments comprises:
   partitioning a first transmission time interface (TTI) D2D transmission into the plurality of segments, wherein each of the plurality of segments fit into a second TTI mission critical (MiCr) uplink subframe, and wherein the first TTI is larger size than the second TTI.

4. The method of claim 2, wherein transmitting the plurality of segments from the first UE to the second UE using direct communication comprises:
   determining a transmission power to be used by the first UE for transmitting the plurality of segments from the first UE to the second UE.

5. The method of claim 4, wherein determining the transmission power to be used by the first UE for transmitting the plurality of segments from the first UE to the second UE, comprises:
   determining whether there is an uplink traffic scheduled for a base station in an uplink macro subframe for a first transmission time interface (TTI);
   transmitting a subset of the plurality of segments at a maximum transmission power on a subframe of a second TTI based on the determining that there is no uplink traffic scheduled for the base station in the uplink macro subframe for the first TTI; and
   transmitting the subset of the plurality of segments at a reduced transmission power on a second TTI subframe based on the determining that there is uplink traffic scheduled for the base station in the uplink macro subframe for the first TTI.

6. The method of claim 2, wherein scheduling transmission of the plurality of segments in the one or more time slots reserved for uplink macro communication, comprises:
   determining whether there is an uplink traffic scheduled for a base station in an uplink macro subframe for a first transmission time interface (TTI);
   suspending the transmission of the plurality of segments for a subframe when there is the uplink traffic scheduled for the base station in the uplink macro subframe for a first TTI.

7. The method of claim 1, wherein the suspend message includes a suspend duration period that indicates a length of time that the communication between the first UE and the second UE is to be suspended.

8. The method of claim 1, further comprising:
receiving, at the first UE, a resume message from the base station when a third UE has completed transmission of uplink traffic to the base station.

9. The method of claim 8, wherein the first UE utilizes a transmission time interface (TTI) that is longer than a TTI utilized by the third UE.

10. An apparatus for wireless communications, comprising:
a processor; and
a memory coupled to the processor, wherein the memory includes instructions executable by the processor to:
identify a packet for transmission from a first user equipment (UE) to a second UE via a device-to-device (D2D) transmission;
receive, at the first UE, a suspend message from a base station when the packet is scheduled for transmission between the first UE and the second UE during a time period reserved for an uplink communication; and
suspend, at the first UE, communication of the packet with the second UE based on receiving the suspend message from the base station.

11. The apparatus of claim 10, wherein the instructions to suspend communication between the first UE and the second UE are further executable by the processor to:
partition the packet into a plurality of segments;
schedule transmission of the plurality of segments in one or more time slots; and
transmit the plurality of segments from the first UE to the second UE using direct communication in the one or more time slots.

12. The apparatus of claim 11, wherein the instructions to partition the packet into the plurality of segments are further executable by the processor to:
partition a first transmission time interface (TTI) D2D transmission into the plurality of segments, wherein each of the plurality of segments fit into a second TTI mission critical (MiCr) uplink subframe, and wherein the first TTI is larger size than the second TTI.

13. The apparatus of claim 11, wherein the instructions to transmit the plurality of segments from the first UE to the second UE are further executable by the processor to:
determine a transmission power to be used by the first UE for transmitting the plurality of segments from the first UE to the second UE.

14. The apparatus of claim 13, wherein the instructions to determine the transmission power to be used by the first UE for transmitting the plurality of segments from the first UE to the second UE are further executable by the processor to:
determine whether there is an uplink traffic scheduled for a base station in an uplink macro subframe for a first transmission time interface (TTI);
transmit a subset of the plurality of segments at a maximum transmission power on a subframe of a second TTI based on the determining that there is no uplink traffic scheduled for the base station in the uplink macro subframe for the first TTI; and
transmit the subset of the plurality of segments at a reduced transmission power on a second TTI subframe based on the determining that there is uplink traffic scheduled for the base station in the uplink macro subframe for the first TTI.

15. The apparatus of claim 11, wherein the instructions to schedule transmission of the plurality of segments in the one or more time slots reserved for uplink macro communication are further executable by the processor to:
determine whether there is an uplink traffic scheduled for a base station in an uplink macro subframe for a first transmission time interface (TTI);
suspend the transmission of the plurality of segments for a subframe when there is the uplink traffic scheduled for the base station in the uplink macro subframe for a first TTI.

16. The apparatus of claim 10, wherein the suspend message includes a suspend duration period that indicates a length of time that the communication between the first UE and the second UE is to be suspended.

17. The apparatus of claim 10, wherein the instructions are further executable to:
receive, at the first UE, a resume message from the base station when a third UE has completed transmission of uplink traffic to the base station.

18. The apparatus of claim 17, wherein the first UE utilizes a transmission time interface (TTI) that is longer than a TTI utilized by the third UE.

19. A non-transitory computer readable medium for wireless communications comprising code for:
identifying a packet for transmission from a first user equipment (UE) to a second UE via a device-to-device (D2D) transmission;
receiving, at the first UE, a suspend message from a base station when the packet is scheduled for transmission between the first UE and the second UE during a time period reserved for an uplink communication; and
suspending, at the first UE, communication of the packet with the second UE based on receiving the suspend message from the base station.

20. The non-transitory computer readable medium of claim 19 further comprising code for:
partitioning the packet into a plurality of segments;
scheduling transmission of the plurality of segments in one or more time slots; and
transmitting the plurality of segments from the first UE to the second UE using direct communication in the one or more time slots.

21. The non-transitory computer readable medium of claim 20, wherein the code for partitioning the packet into the plurality of segments further comprises:
partitioning a first transmission time interface (TTI) D2D transmission into the plurality of segments, wherein each of the plurality of segments fit into a second TTI mission critical (MiCr) uplink subframe, and wherein the first TTI is larger size than the second TTI.

22. The non-transitory computer readable medium of claim 20, wherein the code for transmitting the plurality of segments from the first UE to the second UE using direct communication further comprises:
determining a transmission power to be used by the first UE for transmitting the plurality of segments from the first UE to the second UE.

23. The non-transitory computer readable medium of claim 22, wherein the code for determining the transmission power to be used by the first UE for transmitting the plurality of segments from the first UE to the second UE further comprises:
determining whether there is an uplink traffic scheduled for a base station in an uplink macro subframe for a first transmission time interface (TTI);
transmitting a subset of the plurality of segments at a maximum transmission power on a subframe of a second TTI based on the determining that there is no uplink traffic scheduled for the base station in the uplink macro subframe for the first TTI; and transmitting the subset of the plurality of segments at a reduced transmission power on a second TTI subframe based on the determining that there is uplink traffic scheduled for the base station in the uplink macro subframe for the first TTI.

24. The non-transitory computer readable medium of claim 20, wherein the code for scheduling transmission of the plurality of segments in the one or more time slots reserved for uplink macro communication further comprises:
   determining whether there is an uplink traffic scheduled for a base station in an uplink macro subframe for a first transmission time interface (TTI);
   suspending the transmission of the plurality of segments for a subframe when there is the uplink traffic scheduled for the base station in the uplink macro subframe for a first TTI.

25. The non-transitory computer readable medium of claim 19, wherein the suspend message includes a suspend duration period that indicates a length of time that the communication between the first UE and the second UE is to be suspended.

26. The non-transitory computer readable medium of claim 19 further including code for:
   receiving, at the first UE, a resume message from the base station when a third UE has completed transmission of uplink traffic to the base station.

27. The non-transitory computer readable medium of claim 26, wherein the first UE utilizes a transmission time interface (TTI) that is longer than a TTI utilized by the third UE.

28. An apparatus for wireless communications, comprising:
   means for identifying a packet for transmission from a first user equipment (UE) to a second UE via a device-to-device (D2D) transmission;
   means for receiving, at the first UE, a suspend message from a base station when the packet is scheduled for transmission between the first UE and the second UE during a time period reserved for an uplink communication; and
   means for suspending, at the first UE, communication of the packet with the second UE based on receiving the suspend message from the base station.

29. The apparatus of claim 28, wherein the means for suspending the communication between the first UE and the second UE further comprises:
   means for partitioning the packet into a plurality of segments;
   means for scheduling transmission of the plurality of segments in one or more time slots; and
   means for transmitting the plurality of segments from the first UE to the second UE using direct communication in the one or more time slots.

30. The apparatus of claim 28, wherein the suspend message includes a suspend duration period that indicates a length of time that the communication between the first UE and the second UE is to be suspended.

* * * * *